Aug. 30, 1932.  E. F. BENSON  1,874,424
COLLAPSIBLE BRACKET
Filed Sept. 21, 1928

INVENTOR
Edward F. Benson.
BY
ATTORNEY

Patented Aug. 30, 1932

1,874,424

UNITED STATES PATENT OFFICE

EDWARD F. BENSON, OF WOODCLIFF ON HUDSON, NEW JERSEY

COLLAPSIBLE BRACKET

Application filed September 21, 1928. Serial No. 307,381.

My invention relates to improvements in collapsible brackets.

An important object of my invention is to provide a bracket of this character which is of simple and practical construction, is strong and durable, and which may be easily and quickly collapsed or disfolded from the extended position, and which is neat and attractive in appearance, and otherwise well adapted for the purposes for which the same is intended.

Another important object of my invention is to provide a bracket of the type described which can be securely locked in extended position.

Other objects and advantages of the invention will be apparent during the course of the following description:

In the accompanying drawing, forming a part of this application and in which like numerals are employed to designate like parts throughout the same.

Figure 1:
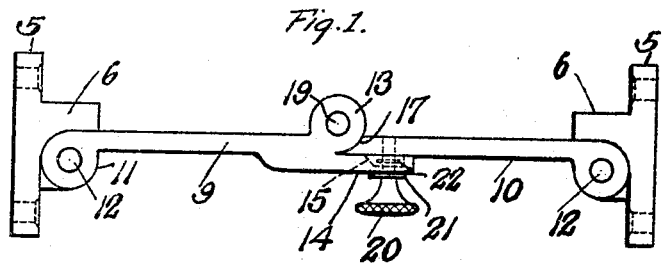
Figure 1 is a side elevation of a bracket embodying my invention.
Figure 2:
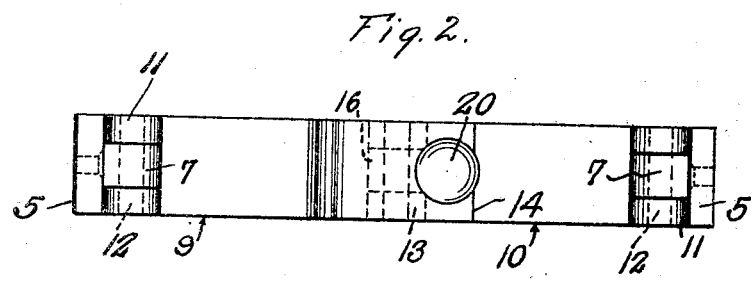
Figure 2 is a bottom plan view of Fig. 1.

Referring now to the drawing in detail the invention comprises a collapsible bracket adapted for attaching to the sections of a folding article, such as a wagon tongue or the like, indicated generally at A. Attaching plates 5 are secured to the folding sections. Each plate 5 is provided with an angular extension 6 having one side cast with bearing lug 7 bored as indicated at 8.

The bracket per se is composed of the arms 9 and 10. The arm 9 has a split bearing member 11 at one end between the furcations of which the bearing lug 7 is received. A hinge pin 12 is projected through the bearing member 11 and the lug 7. By this arrangement, movement of the arm 9 is stopped by the angular extension 6 as seen in Fig. 1. At the remaining end of the arm 9 is another split bearing 13. The same end of the arm 9 is provided with an offset longitudinal extension 14, provided in one face with a recess 15.

The arm 10 is formed at its outward end with a split bearing member 11 between the furcations of which the bearing lug 7 on the associated attaching plate 5 is received. The inward end of the arm 10 is provided with a single bearing member 16 receivable between the furcations of the bearing member 13 on the inward end of the arm 9.

The inward end of the arm 10 is provided in addition with a curved or concaved or otherwise formed angularly related surface 17 and at a distance from the end of the arm 10 there is a screw threaded bore 18.

The arms are assembled to the attaching plates, as stated, by passing hinge pins 12 thru the bearing members 11 of the arms and through the bearing lugs 7 of the attaching plates, so that the extensions 6 act as stops for the arms. The arms are assembled in hinged relation by placing the bearing member 16 between the furcations of the split bearing member 13 on the inward end of the arm 9 and passing a hinge pin 19 through the furcations and the single bearing member. When so assembled, the extension 14 overlaps the inward end of the arm 10 as seen in Fig. 1. At the same time, the angularly related surface 17 at the inward end of the arm 10 is engaged with the adjacent surface of the bearing members 13, as seen also in Fig. 1. The shape of the angularly related surface is to be conformed with the shape of the member which it is disposed to engage.

In the position of the arms 9 and 10 shown in Fig. 1, a thumb screw 20, having a bearing flange or washer 21 adapted for engagement with the adjacent surface of the extension 14, is passed through the extension 14 and through the recess 15 and is threaded into the threaded bore 18 in the arm 10. Rotation of the screw 20 in the tightening direction will clamp the various parts of the bracket described rigidly in the positions shown in Fig. 1.

Figure 4:
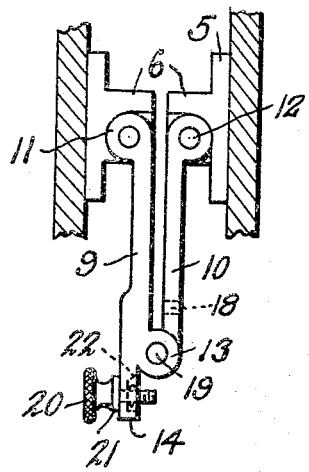
Figure 4 is a side elevational view of my bracket in folded position and applied so as to join two movable objects, such as are shown in section.
Figure 3:
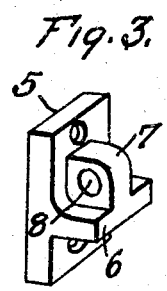
Figure 3 is a perspective view of one of the attaching plates.

A pin 22 or the like is secured to a portion of the screw 20 within the recess 15 to maintain the screw against falling from the arm 9 when the screw is not engaged with the arm 10, as when the bracket is folded or collapsed. A collapsed position of my bracket is shown in Fig. 4, wherein it is shown attached to movable sections of a structure such as a collapsible wagon tongue, a collapsible automobile top, a collapsible chair or table, collapsible shelf, and the like.

It is to be understood that the form of my invention herewith shown and described is to be taken as a preferred embodiment of the same, and that various changes in the shape, size and arrangement of parts may be resorted to without departing from the spirit of my invention or the scope of the subjoined claims.

Having thus described my invention what I claim as new is:

1. A collapsible bracket comprising a pair of arms having bearing means formed at each end, attaching plates at the outer ends of the arms also having bearing means thereon, pins at the ends of the arms for pivotally connecting the inner ends thereof to each other and for pivotally connecting the outer ends of the arms to said plates, an extension formed at the inner end of one of the arms for overlapping the other of said arms, a thumb screw threaded through the extension and the overlapped arm, a pin disposed transversely of the screw and disposed at the side of the extension opposite from the head of the screw whereby to prevent separation of the screw from the extension and a recess formed in the extension to accommodate the transverse pin to enable the close engagement of the extension with the overlapped arm to form a stop for said arm.

2. A collapsible bracket of the type described comprising a main arm, a split eye formed to depend from the outer end of the main arm, and a support bracket carrying a pin on which the said eye is horizontally journaled and a stop member on said support adapted to be abutted by the upper outer end portion of the main arm and form a stop to limit upward movement of the arm beyond horizontal position, and another split eye formed to project upwardly from the inner end of the main arm, and a parallel depressed portion formed below the plane of the main arm and as an extension thereof beyond the said split eye; and a secondary arm having its inner end formed with a concaved lip portion for engaging in an angle formed by the outer surface of the last mentioned split eye and the depressed portion, and the contiguous end portion of the secondary arm adapted to rest upon the upper surface of said depressed extension, and a split eye formed to depend from the outer end of the secondary arm, and a support bracket carrying a pin on which said eye is horizontally journaled and a stop member on said support adapted to be abutted by the upper outer end portion of the secondary arm and form a stop to limit upward movement of the arm beyond horizontal position, and a solid eye formed to project upwardly from the inner end of the secondary arm, said solid eye to be engaged between the furcations of the split eye on the inner end of the main arm, and a pivot pin through said split eye and said solid eye; and a thumb screw having its shank passed through a vertical aperture in the extension on the main arm, the upper surface of said extension having a recess concentric with said aperture, and a pin extending from the shank of the thumb screw to prevent the thumb screw from falling out of the aperture, and the end of the said shank adapted to screw thread into a screw threaded vertical hole in the inner end portion of the secondary arm, for positively preventing movement of the arms.

Signed at Woodcliff on Hudson in the county of Hudson and State of New Jersey this 17th day of September A. D. 1928.

EDWARD F. BENSON.